United States Patent
Lee et al.

(10) Patent No.: US 7,605,889 B2
(45) Date of Patent: Oct. 20, 2009

(54) PIXEL STRUCTURE AND FABRICATION METHOD THEREOF

(75) Inventors: Yi-Wei Lee, Hsinchu (TW); Ching-Yun Chu, Hsinchu (TW); TzuFong Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 301 days.

(21) Appl. No.: 11/617,744

(22) Filed: Dec. 29, 2006

(65) Prior Publication Data

US 2008/0062364 A1    Mar. 13, 2008

(30) Foreign Application Priority Data

Sep. 12, 2006    (TW) .................. 95133605 A

(51) Int. Cl.
G02F 1/1368    (2006.01)
G02F 1/1335    (2006.01)

(52) U.S. Cl. .................. 349/113; 349/43; 349/187; 438/30

(58) Field of Classification Search .............. 349/42, 349/43, 113, 114, 187, 122, 138, 147, 148; 257/59, 72; 345/92; 438/30
See application file for complete search history.

(56) References Cited

U.S. PATENT DOCUMENTS

| | | |
|---|---|---|
| 5,408,345 A | 4/1995 | Mitsui et al. |
| 5,500,750 A | 3/1996 | Kanbe et al. |
| 5,526,149 A | 6/1996 | Kanbe et al. |
| 7,420,634 B2 * | 9/2008 | Lee .................. 349/114 |
| 2004/0135943 A1 * | 7/2004 | Kang et al. .................. 349/113 |
| 2005/0083461 A1 | 4/2005 | Yang et al. |
| 2006/0170845 A1 * | 8/2006 | Lee .................. 349/114 |

* cited by examiner

*Primary Examiner*—Dung Nguyen
*Assistant Examiner*—Tai Duong
(74) *Attorney, Agent, or Firm*—Jianq Chyun IP Office

(57) ABSTRACT

A pixel structure including a substrate, a gate, a dielectric layer, a semiconductor layer, a plurality of semiconductor bumps, a source, a drain and a reflective pixel electrode is disclosed. The gate is disposed on the substrate. The dielectric layer is disposed on the substrate and covers the gate. The semiconductor layer is disposed on the dielectric layer over the gate. The semiconductor bumps are disposed on the dielectric layer. The source and drain are disposed on the semiconductor layer. The reflective pixel electrode covering the semiconductor bumps is disposed on the dielectric layer and electrically connected to the drain.

15 Claims, 8 Drawing Sheets

PIXEL STRUCTURE AND FABRICATION METHOD THEREOF

CROSS-REFERENCE TO RELATED APPLICATION

This application claims the priority benefit of Taiwan application serial no. 95133605, filed Sep. 12, 2006. All disclosure of the Taiwan application is incorporated herein by reference.

BACKGROUND OF THE INVENTION

1. Field of the Invention

The present invention generally relates to a pixel structure and the fabrication method thereof, and more particular, to a pixel structure for use in a liquid crystal display (LCD) and the fabrication method thereof.

2. Description of Related Art

Thin film transistor LCDs (TFT-LCDs) usually are classified into transmissive TFT-LCDs, reflective TFT-LCDs, and transflective TFT-LCDs, depending on the light source and the array substrate thereof. For the transmissive TFT-LCD, a backlight source is mostly used as the light source thereof, while the TFT array substrate uses transparent electrodes as the pixel electrodes so as to allow the light from the backlight source to pass therethrough. For the reflective TFT-LCD, a front-light source or an external light source is usually used as the light source thereof, while the TFT array substrate uses reflective electrodes made of a metal or of a material having good reflection characteristic as the pixel electrodes so as to reflect the light from the front-light source or the external light source. For the transflective TFT-LCD, which can be seen as a structure integration of a transmissive TFT-LCD and a reflective TFT-LCD, and a backlight source and a front-light source/external light source are simultaneously used for the display thereof.

FIGS. 1A-1D are diagrams showing the fabrication steps of a conventional pixel structure applicable to a transflective LCD. Referring to FIG. 1A, the fabrication of such conventional pixel structure includes the following steps. First, a substrate 110 is provided, and next, a gate 120, a gate insulation layer 130, a semiconductor layer 140, a source 150a and a drain 150b are sequentially formed over the substrate 110. The gate insulation layer 130 covers the gate 120. The semiconductor layer 140 is disposed on the gate insulation layer 130 and located above the gate 120, and the source 150a and the drain 150b are disposed on the semiconductor layer 140.

Referring to FIG. 1B, a passivation layer 160 is formed over the substrate 110 to cover the gate insulation layer 130, the source 150a and the drain 150b. In addition, the passivation layer 160 has a contact hole 160a to expose part of the drain 150b. Further, a plurality of bumps 170 is formed on part of the passivation layer 160. In more detail, a patterned photoresist layer (not shown) is formed on the passivation layer 160, followed by performing a reflow process on the patterned photoresist layer to complete forming the bumps 170.

Referring to FIGS. 1C and 1D, a reflective pixel electrode 180a and a transparent pixel electrode 180b are sequentially formed on the passivation layer 160, wherein the reflective pixel electrode 180a covers the bumps 170 and is electrically connected to the drain 150b through the contact hole 160a, while the transparent pixel electrode 180b covers the reflective pixel electrode 180a and is electrically connected to the drain 150b through the reflective pixel electrode 180a.

Since the reflective pixel electrode 180a covers the bumps 170, the amount of the light reflected by reflective pixel electrode 180a is accordingly increased. However, since the bumps 170 are made of photoresist material containing a solvent, the reliability of the bumps 170 declines. Moreover, the total manufacturing cost is increased due to the cost of the bumps 170.

SUMMARY OF THE INVENTION

Accordingly, the present invention is to provide a pixel structure with advanced reliability.

The present invention is to provide a method for fabricating a pixel structure to simplify the process.

The present invention is to provide a method for fabricating a pixel structure to reduce the number of photomasks.

To achieve the above-mentioned or other objectives, the present invention provides a pixel structure, which includes a substrate, a gate, a first dielectric layer, a semiconductor layer, a plurality of semiconductor bumps, a source, a drain and a reflective pixel electrode. The gate is disposed on the substrate, and the first dielectric layer is disposed on the substrate to cover the gate. The semiconductor layer is disposed on the first dielectric layer located above the gate, while the semiconductor bumps are disposed on the first dielectric layer. The source and the drain are disposed on the semiconductor layer. The reflective pixel electrode covering the semiconductor bumps is disposed on the first dielectric layer, and is electrically connected to the drain.

In an embodiment of the present invention, the pixel structure further includes a second dielectric layer and a transparent pixel electrode, wherein the second dielectric layer is disposed on the first dielectric layer and covers the semiconductor layer, the source, the drain and the reflective pixel electrode. In addition, the second dielectric layer has a contact hole, which exposes a part of the drain. The transparent pixel electrode is disposed on the second dielectric layer and electrically connected to the drain through the contact hole.

In an embodiment of the present invention, the pixel structure further includes a second dielectric layer, which is disposed on the first dielectric layer and covers the semiconductor bumps. In addition, the second dielectric layer has a contact hole which exposes a part of the drain, while the reflective pixel electrode is disposed on the second dielectric layer and electrically connected to the drain through the contact hole.

In an embodiment of the present invention, the pixel structure further includes a transparent pixel electrode, the transparent pixel electrode is disposed between the second dielectric layer and the reflective pixel electrode and electrically connected to the drain through the contact hole, while the reflective pixel electrode is electrically connected to the drain through the transparent pixel electrode.

In an embodiment of the present invention, the pixel structure further includes a transparent pixel electrode, which is disposed on the reflective pixel electrode and is electrically connected to the drain through the reflective pixel electrode.

In an embodiment of the present invention, the semiconductor layer and the semiconductor bumps can be the same layer.

In an embodiment of the present invention, the pixel structure further includes an ohmic contact layer disposed between the source, the drain and the semiconductor layer and disposed on the semiconductor bumps.

The present invention provides a fabrication method of a pixel structure. The fabrication method includes the following steps. First, a substrate is provided, followed by forming a gate on the substrate. Next, a first dielectric layer is formed on the substrate to cover the gate. Then, a semiconductor layer and a plurality of semiconductor bumps are formed on the first dielectric layer, wherein the semiconductor layer is located on the first dielectric layer above the gate. After that, a source, a drain and a reflective pixel electrode are formed on the first dielectric layer, wherein the source and the drain respectively cover a part of the semiconductor layer and the reflective pixel electrode is electrically connected to the drain and covers the semiconductor bumps.

In an embodiment of the present invention, after forming the source, the drain and the reflective pixel electrode, the fabrication method of a pixel structure further includes forming a second dielectric layer over the substrate, wherein the second dielectric layer covers the substrate and has a contact hole to expose a part of the drain; further forming a transparent pixel electrode on the second dielectric layer, wherein the transparent pixel electrode is electrically connected to the drain through the contact hole.

In an embodiment of the present invention, the step of forming the semiconductor layer and the semiconductor bumps includes forming a semiconductor material layer on the first dielectric layer and, then, patterning the semiconductor material layer to complete forming the semiconductor layer and the semiconductor bumps.

In an embodiment of the present invention, after forming the semiconductor material layer, the fabrication method of a pixel structure further includes forming an ohmic contact material layer on the semiconductor material layer.

The present invention provides a fabrication method of a pixel structure, which includes the steps as follows. First, a substrate is provided, followed by forming a gate on the substrate. Next, a first dielectric layer is formed on the substrate to cover the gate. Then, a semiconductor layer and a plurality of semiconductor bumps are formed on the first dielectric layer, wherein the semiconductor layer is located on the first dielectric layer above the gate. After that, a source and a drain are formed on the first dielectric layer, wherein the source and the drain respectively cover a part of the semiconductor layer. Further, a second dielectric layer is formed over the substrate, wherein the second dielectric layer covers the substrate and has a contact hole to expose a part of the drain, while the second dielectric layer covers the semiconductor bumps. Furthermore, a reflective pixel electrode is formed on the second dielectric layer, and the reflective pixel electrode is electrically connected to the drain through the contact hole.

In an embodiment of the present invention, the reflective pixel electrode is formed on the second dielectric layer over the semiconductor bumps.

In an embodiment of the present invention, prior to forming the reflective pixel electrode on the second dielectric layer, the fabrication method of a pixel structure further includes forming a transparent pixel electrode on the second dielectric layer, wherein the transparent pixel electrode is electrically connected to the drain through the contact hole, while the reflective pixel electrode is electrically connected to the drain through the transparent pixel electrode.

In an embodiment of the present invention, after forming the reflective pixel electrode on the second dielectric layer, the fabrication method of a pixel structure further includes forming a transparent pixel electrode on the reflective pixel electrode, wherein the transparent pixel electrode is electrically connected to the drain through the reflective pixel electrode.

In an embodiment of the present invention, the step of forming the semiconductor layer and the semiconductor bumps includes forming a semiconductor material layer on the first dielectric layer and, then, patterning the semiconductor material layer to form the semiconductor layer and the semiconductor bumps.

In an embodiment of the present invention, after forming the semiconductor material layer, the fabrication method of a pixel structure further includes forming an ohmic contact material layer on the semiconductor material layer.

Since the present invention adopts a fabrication method to form the bumps directly from the semiconductor layer, not only the process of the present invention is simpler, but also the pixel electrode formed by using the process of the present invention has better reliability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

First Embodiment

Figure 1A:
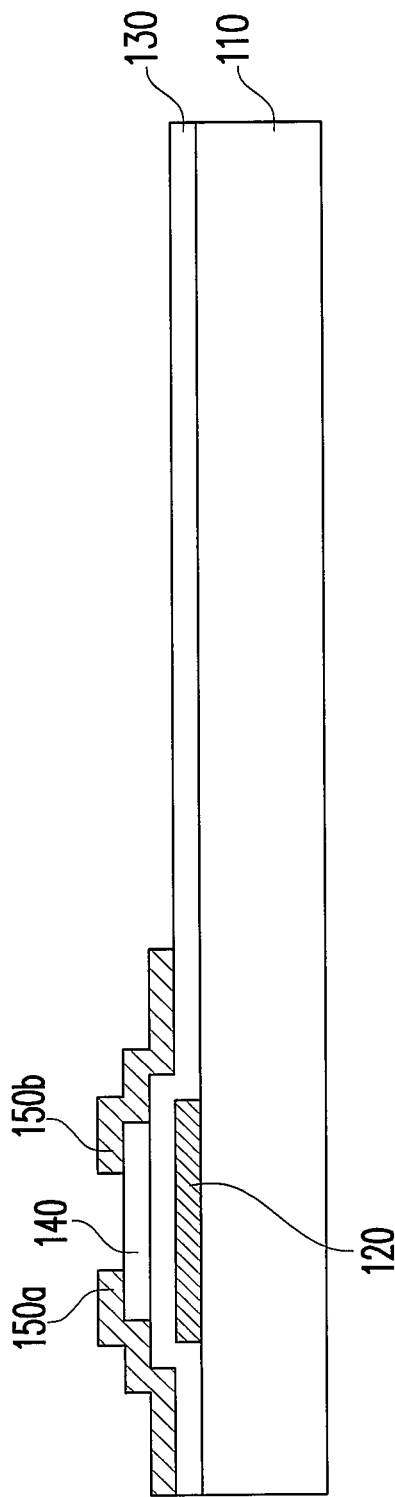
FIGS. 1A-1D are diagrams showing the fabrication steps of a conventional pixel structure applicable to a transflective LCD.
Figure 1B:
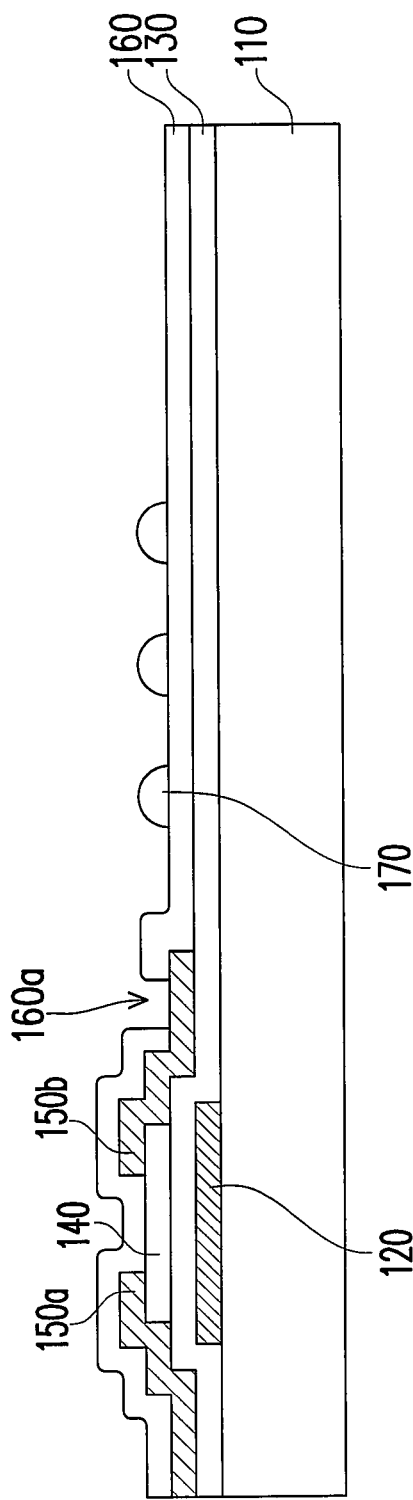
Figure 1C:
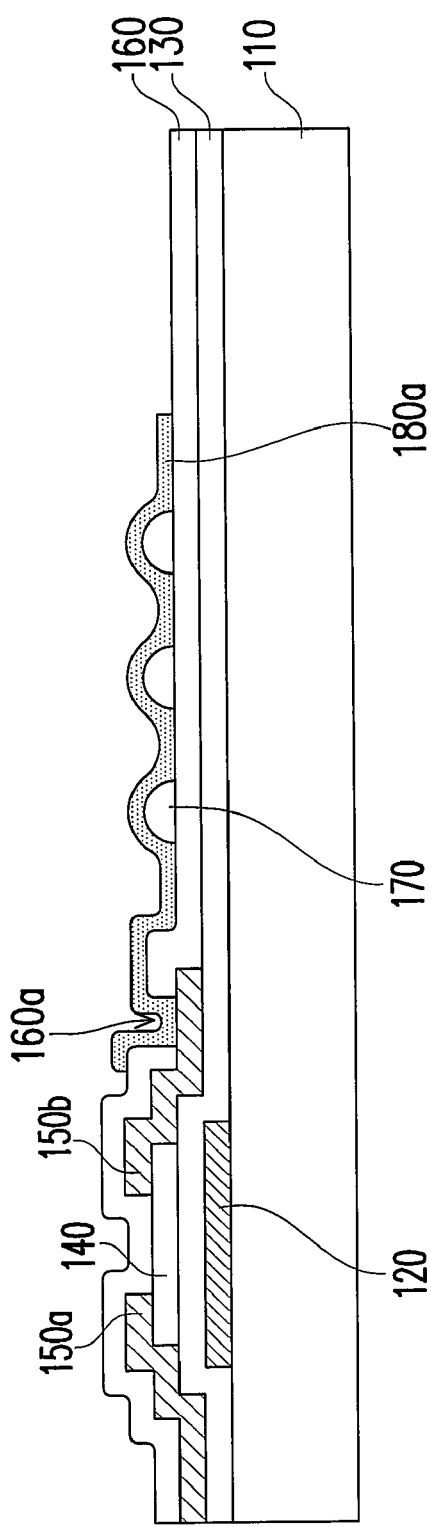
Figure 1D:
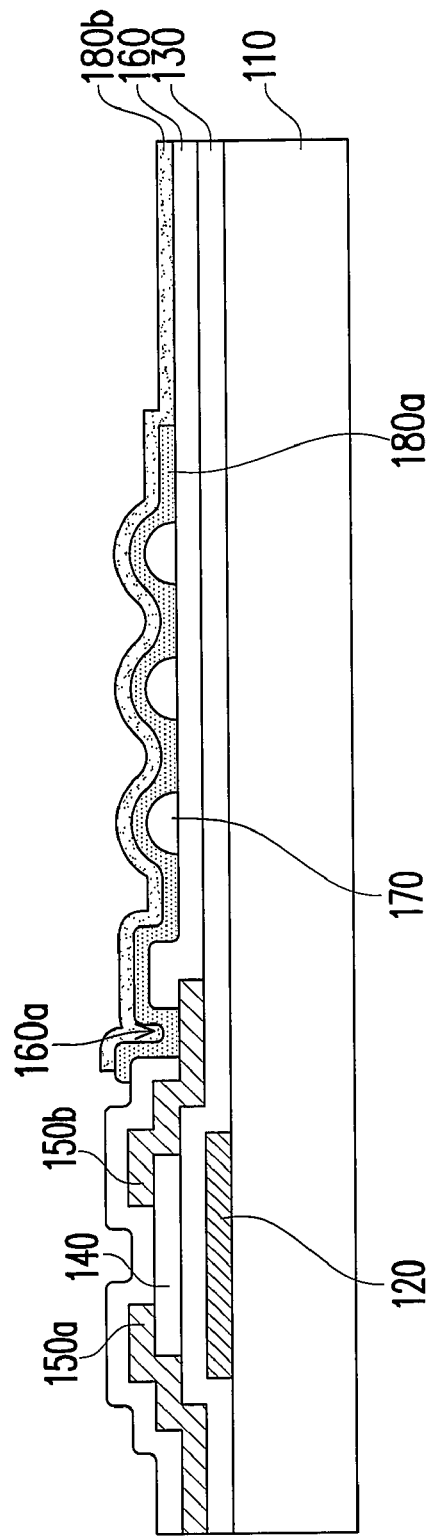
Figure 2A:
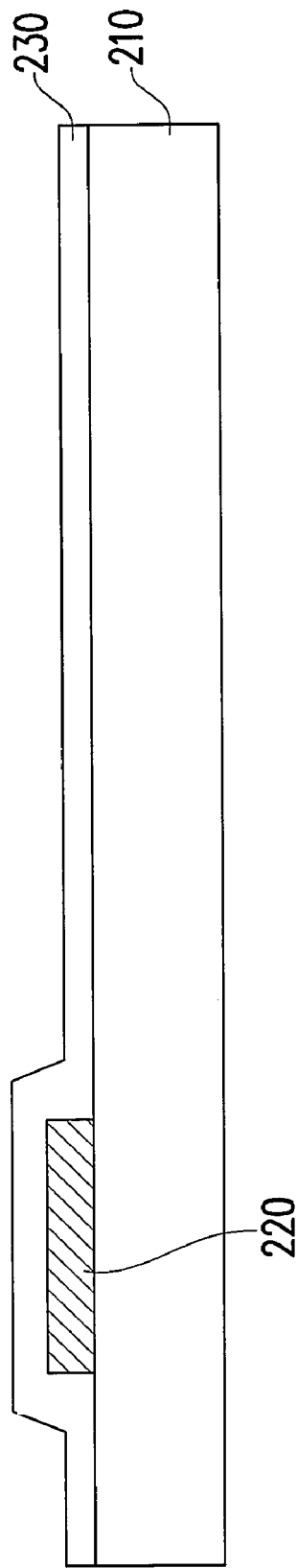
FIGS. 2A-2E are diagrams showing the fabrication method of a pixel structure according to the first embodiment of the present invention.

FIGS. 2A-2E are diagrams showing the fabrication method of a pixel structure according to the first embodiment of the present invention. Referring to FIG. 2A, the fabrication method of a pixel structure of the present embodiment includes the following steps. First, a substrate 210 is provided, followed by forming a gate 220 on the substrate 210. In more detail, firstly, a first conductor layer (not shown) is formed on the substrate 210 and, then, a patterning process is performed on the first conductor layer to form the gate 220. Next, a first dielectric layer 230 covering the gate 220 is formed over the substrate 210. The method for forming the first dielectric layer 230 is, for example but not limited to, plasma-enhanced chemical vapor deposition (PECVD) process, and the first dielectric layer 230 is formed in a temperature lower than 300° C., for example.

Figure 2B:
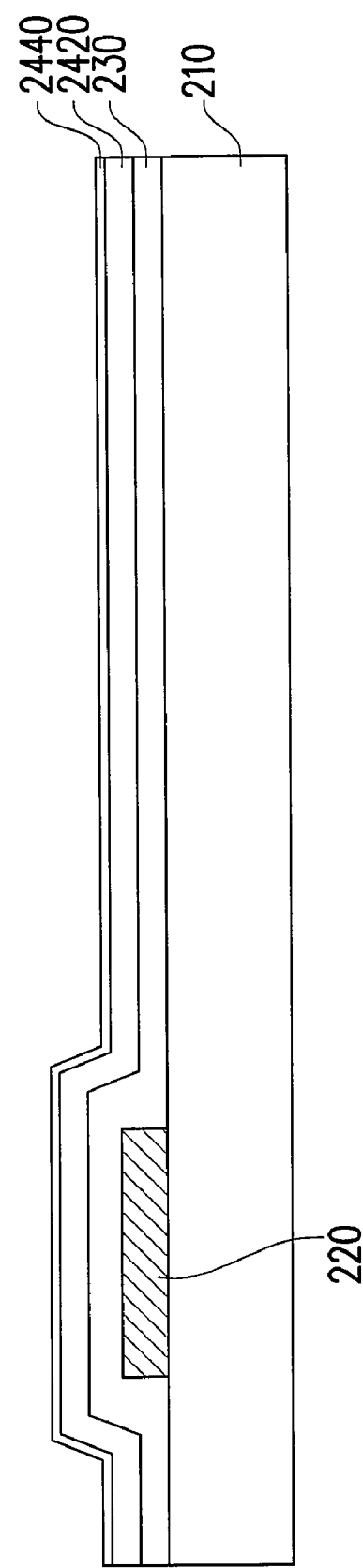
Figure 2C:
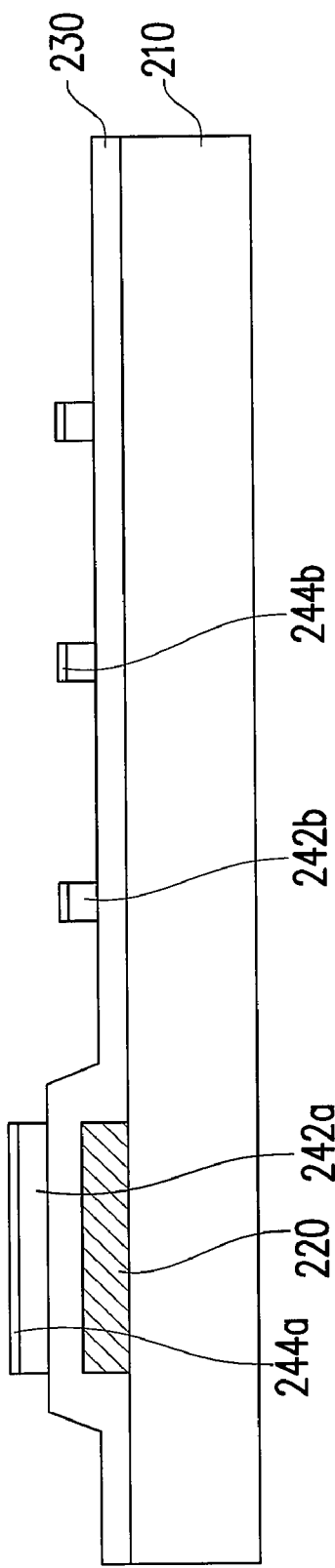

Referring to FIGS. 2B and 2C, a semiconductor layer 242a and a plurality of semiconductor bumps 242b are formed on the first dielectric layer 230, wherein the semiconductor layer 242a is located on the first dielectric layer 230 over the gate 220. The semiconductor bumps 242b can be arranged randomly or following a predetermined specification. In more detail, a semiconductor material layer 2420 is formed on the first dielectric layer 230, and then a patterning process is performed on the semiconductor material layer 2420 to form the semiconductor layer 242a and the semiconductor bumps 242b. In addition, in order to advance the electrical quality, after forming the semiconductor material layer 2420, an ohmic contact material layer 2440 is formed on the semiconductor material layer 2420. After that, a patterning process is performed on the semiconductor material layer 2420 and the ohmic contact material layer 2440, so that an ohmic contact layer 244a is formed on the semiconductor layer 242a and an ohmic contact layer 244b is formed on the semiconductor bumps 242b. The patterning process includes a photolithography process and an etching process, for example.

Figure 2D:
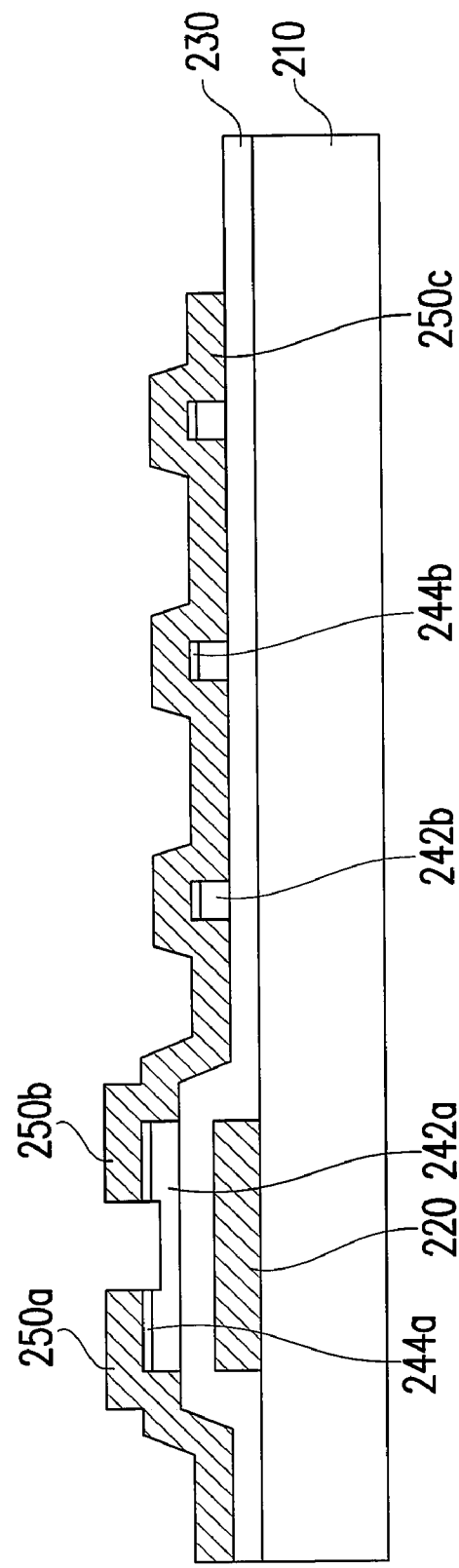

Referring to FIG. 2D, further, a source 250a, a drain 250b and a reflective pixel electrode 250c are formed on the first dielectric layer 230, wherein the source 250a and the drain 250b, respectively, cover a part of the semiconductor layer 242a, and the reflective pixel electrode 250c is electrically connected to the drain 250b and covers the semiconductor bumps 242b. In more detail, a second conductor layer (not shown) is formed on the first dielectric layer 230, and then a patterning process is performed on the second conductor layer to form the source 250a, the drain 250b and the reflective pixel electrode 250c. Besides, after forming the source 250a and the drain 250b, the source 250a and the drain 250b are used as a photomask, and a back channel etching (BCE) process with the photomask is performed to remove the ohmic contact layer 244a between the source 250a and the drain 250b. Note that the pixel structure formed by the above-described process is applicable to a reflective LCD. However, the present embodiment allows to be modified by adding other steps, so as to form a pixel structure applicable to a transflective LCD, as described hereinafter.

Figure 2E:
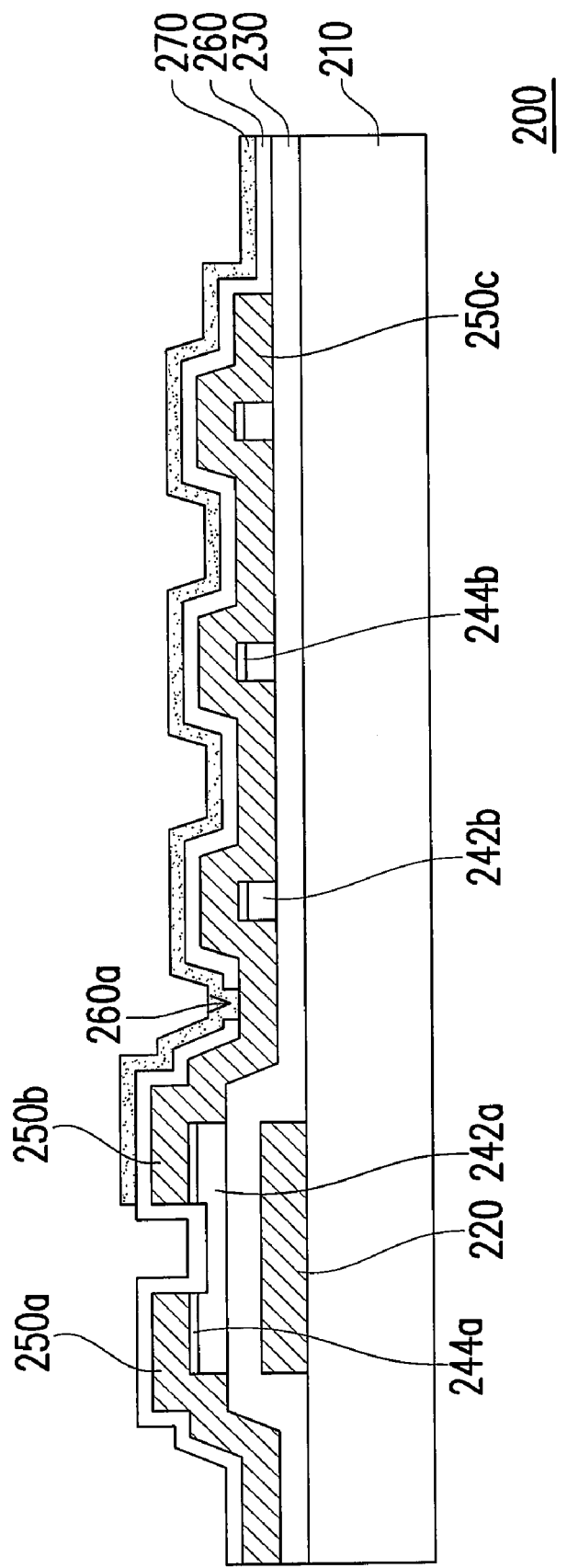

Referring to FIG. 2E, furthermore, a second dielectric layer 260 is formed over the substrate 210, wherein the second dielectric layer 260 covers the substrate 210 and has a contact hole 260a to expose a part of the drain 250b. The method for forming the second dielectric layer 260 is, for example but not limited to, plasma-enhanced chemical vapor deposition (PECVD) process, and the second dielectric layer 260 is formed in a temperature lower than 300° C., for example. After that, a transparent pixel electrode 270 is formed on the second dielectric layer 260, and the transparent pixel electrode 270 is electrically connected to the drain 250b through the contact hole 260a. The following describes the structure of the pixel structure 200.

Continuing to FIG. 2E, the pixel structure 200 includes a substrate 210, a gate 220, a first dielectric layer 230, a semiconductor layer 242a, a plurality of semiconductor bumps 242b, ohmic contact layers 244a and 244b, a source 250a, a drain 250b, a reflective pixel electrode 250c, a second dielectric layer 260 and a transparent pixel electrode 270. The gate 220 is disposed on the substrate 210. The first dielectric layer 230 is disposed on the substrate 210 and covers the gate 220. The semiconductor layer 242a is disposed on the first dielectric layer 230 over the gate 220. The semiconductor bumps 242b are formed on the first dielectric layer 230. The source 250a and the drain 250b are disposed over the semiconductor layer 242a. The reflective pixel electrode 250c covering the semiconductor bumps 242b is disposed on the first dielectric layer 230, and is electrically connected to the drain 250b.

In addition, the ohmic contact layer 244a is disposed between the source 250a/drain 250b and the semiconductor layer 242a, while the ohmic contact layer 244b is disposed on the semiconductor bumps 242b. The second dielectric layer 260 is disposed on the first dielectric layer 230, covers the semiconductor layer 242a, the source 250a, the drain 250b and the reflective pixel electrode 250c and has a contact hole 260a which exposes a part of the drain 250b. The transparent pixel electrode 270 is disposed on the second dielectric layer 260 and electrically connected to the drain 250b through the contact hole 260a.

In more detail, the substrate 210 can be a glass substrate, a quartz substrate or other type of substrates. The materials of the gate 220, the source 250a, the drain 250b and the reflective pixel electrode 250c are, for example, aluminum (Al), molybdenum (Mo), molybdenum nitride (MoN), titanium (Ti), titanium nitride (TiN), chrome (Cr), chrome nitride (CrN), or other conductor materials. In the embodiment, the structures of the gate 220, the source 250a, the drain 250b and the reflective pixel electrode 250c are, for example, aluminum layer/titanium layer or aluminum layer/titanium nitride layer, wherein the thickness of the aluminum layer is, for example, 500-2000 Å (angstrom), while the thickness of the titanium layer or the titanium nitride layer is 300-1000 Å, for example.

The material of the first dielectric layer 230 is, for example, silicon nitride (SiNx), silicon oxide (SiOx), silicon-oxy-nitride (SiOxNy), or other insulation materials. The thickness of the first dielectric layer 230 is, for example, 1500-4000 Å, while the thickness sum of the semiconductor layer 242a and the ohmic contact layer 244a is, for example, 500-4000 Å. The materials of the semiconductor layer 242a and the semiconductor bumps 242b are, for example, amorphous silicon (a-Si) or polysilicon, while the materials of the ohmic contact layers 244a and 244b are, for example, doped a-Si.

The material of the second dielectric layer 260 is, for example, silicon nitride (SiNx), silicon oxide (SiOx), silicon-oxy-nitride (SiOxNy) or other insulation materials. The thickness of the second dielectric layer 260 is, for example, 500-4000 Å. The material of the transparent pixel electrode 270 is, for example, indium tin oxide (ITO), indium zinc oxide (IZO), zinc aluminum oxide (ZAO, gahnite) or other transparent conductor materials, while the thickness of the transparent pixel electrode 270 is, for example, 500-3000 Å.

Note that the present embodiment does not mandate to form the ohmic contact layers 244a and 244b; on the other hand, although the pixel structure 200 of the present embodiment targets the transflective LCD application, but the provided pixel structure, if without the transparent pixel electrode 270, can be applicable to a reflective LCD as well.

Second Embodiment

Figure 3A:
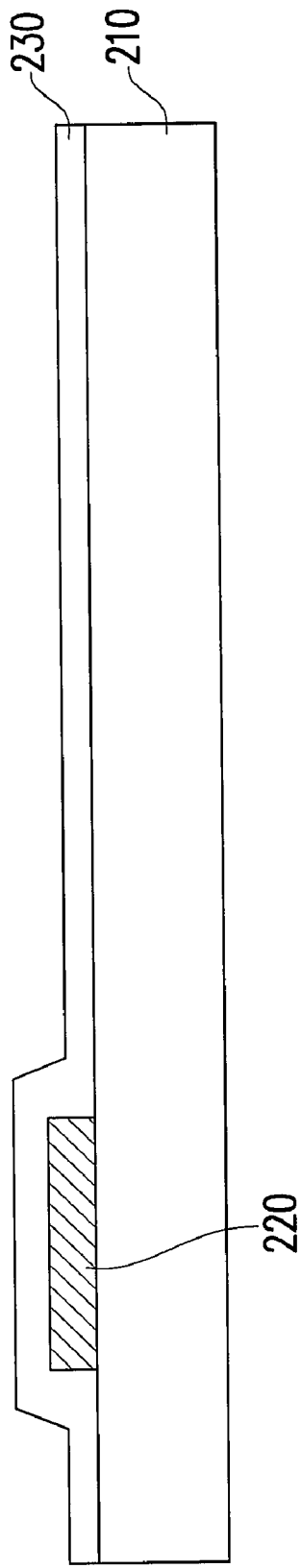
FIGS. 3A-3E are diagrams showing the fabrication method of a pixel structure according to the second embodiment of the present invention.
Figure 3B:
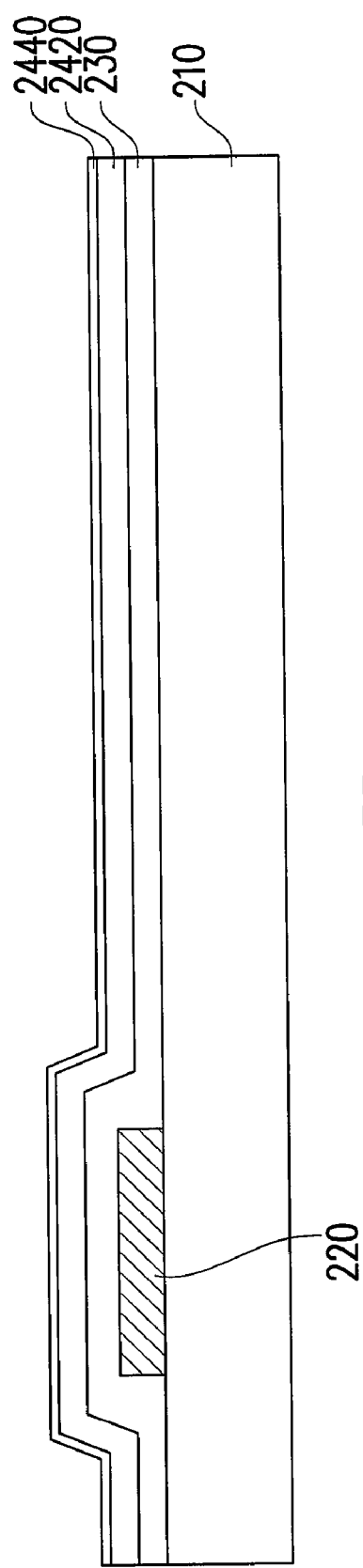
Figure 3C:
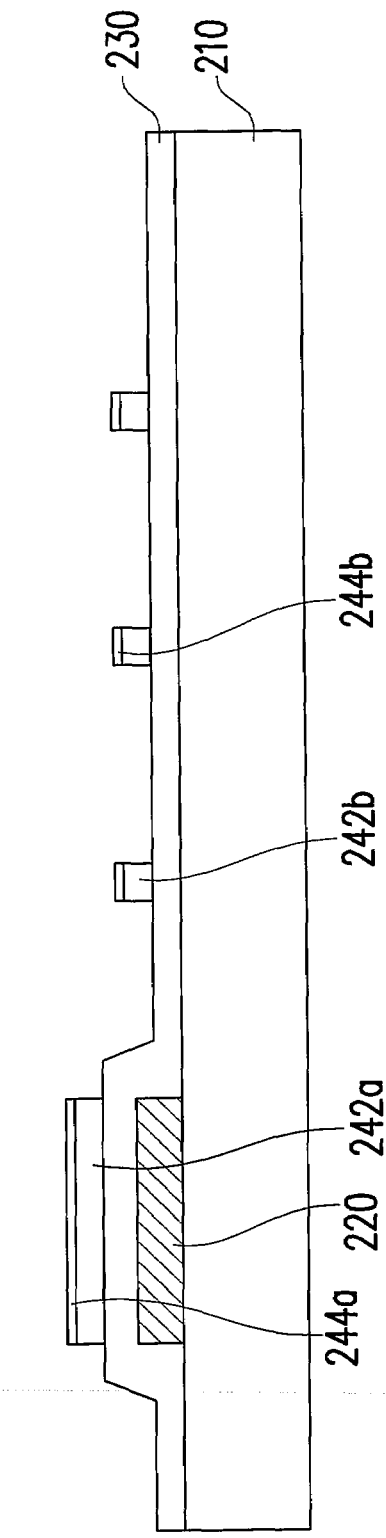

FIGS. 3A-3E are diagrams showing the fabrication method of a pixel structure according to the second embodiment of the present invention. FIGS. 3A to 3C are similar to FIGS. 2A to 2C, so detailed description with respect to FIGS. 3A to 3C is omitted for simplicity.

Figure 3D:
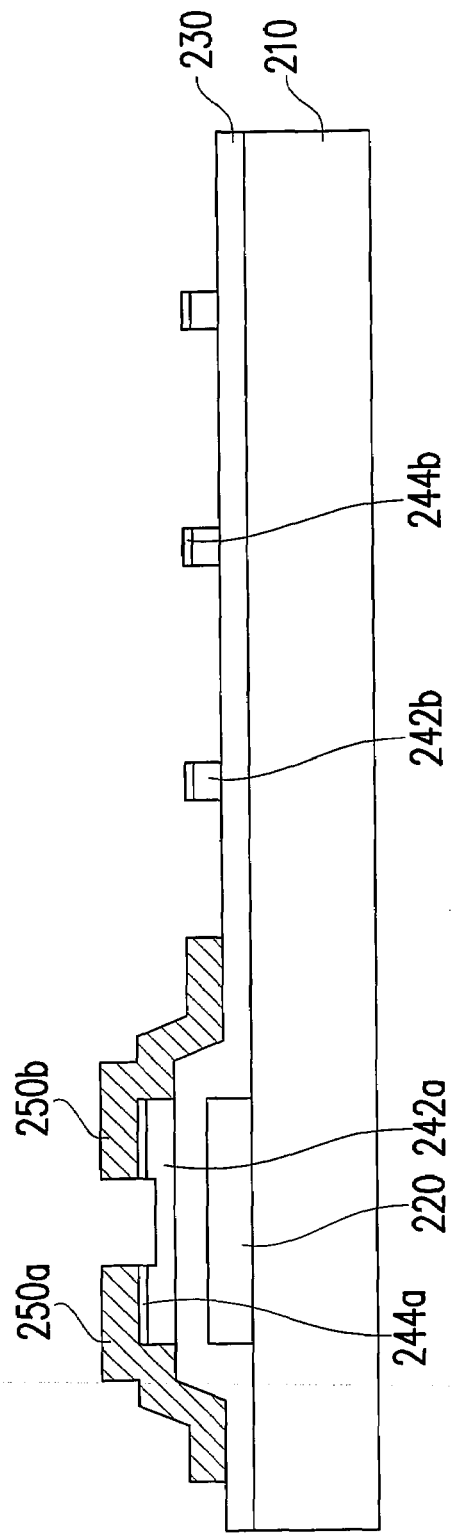
Figure 3E:
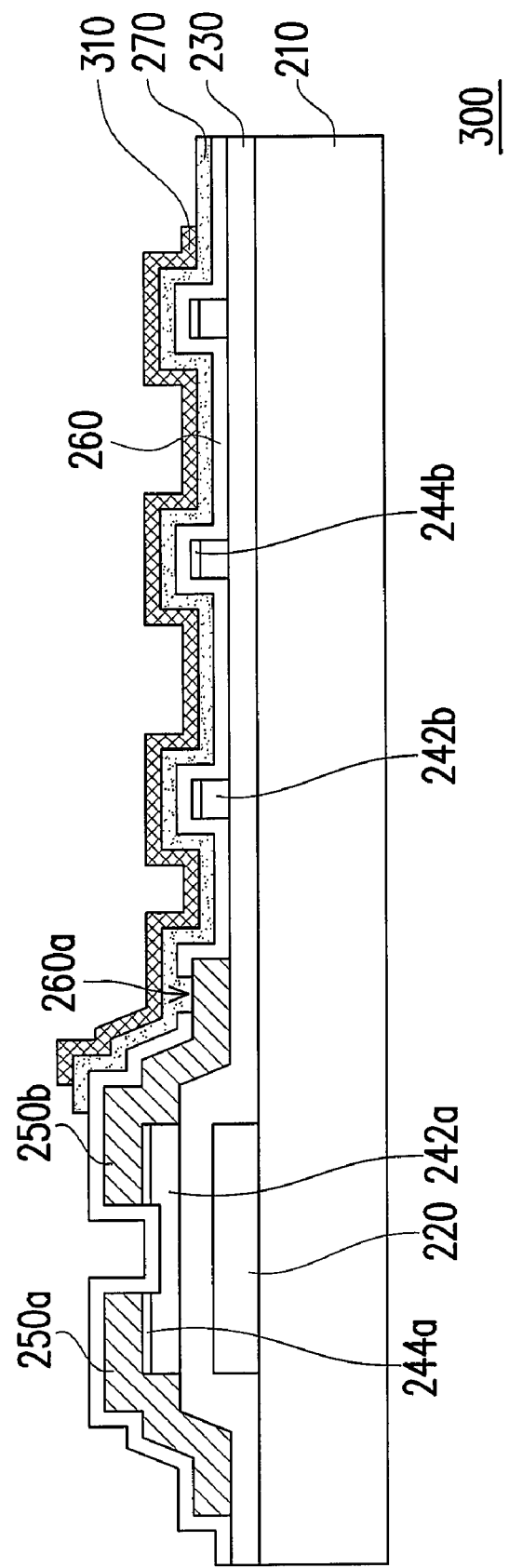

Referring to FIGS. 3D and 3E, a source 250a and a drain 250b are formed on the first dielectric layer 230, wherein the source 250a and the drain 250b respectively cover a part of the semiconductor layer 242a. After forming the source 250a and the drain 250b, the source 250a and the drain 250b are used as a photomask to perform a BCE process, so as to remove the ohmic contact layer 244a between the source 250a and the drain 250b. Then, a second dielectric layer 260 is formed over the substrate 210, wherein the second dielectric layer 260 covers the substrate 210 and has a contact hole 260a to expose a part of the drain 250b. In addition, the second dielectric layer 260 covers the semiconductor bumps 242b as well.

Referring to FIG. 3E, a transparent pixel electrode 270 is formed on the second dielectric layer 260, wherein the transparent pixel electrode 270 is electrically connected to the drain 250b through the contact hole 260a. Further, a reflective pixel electrode 310 is formed on the transparent pixel electrode 270, wherein the reflective pixel electrode 310 is electrically connected to the drain 250b through the transparent pixel electrode 270. At the point, the steps for fabricating the pixel structure 300 applicable to a transflective LCD are almost completely described. In the present embodiment, the transparent pixel electrode 270 and the reflective pixel electrode 310 are sequentially formed; however, the embodiment allows to sequentially form the reflective pixel electrode 310 and the transparent pixel electrode 270. The following describes the structure of the pixel structure 300.

Continuing to FIG. 3E, the pixel structure 300 of the present embodiment includes a substrate 210, a gate 220, a first dielectric layer 230, a semiconductor layer 242a, a plurality of semiconductor bumps 242b, ohmic contact layers 244a and 244b, a source 250a, a drain 250b, a second dielectric layer 260, a transparent pixel electrode 270 and a reflective pixel electrode 310. The gate 220 is disposed on the substrate 210. The first dielectric layer 230 is disposed on the substrate 210 and covers the gate 220. The semiconductor layer 242a is disposed on the first dielectric layer 230 over the gate 220. The semiconductor bumps 242b are disposed on the first dielectric layer 230, and the source 250a and the drain 250b are disposed on the semiconductor layer 242a. Besides, the ohmic contact layer 244a is disposed between the source 250a/drain 250b and the semiconductor layer 242a, while the ohmic contact layer 244b is disposed on the semiconductor bumps 242b.

As shown in FIG. 3E, the second dielectric layer 260 is disposed on the first dielectric layer 230, so as to cover the semiconductor layer 242a, the semiconductor bumps 242b, the source 250a and the drain 250b. The second dielectric layer 260 has a contact hole 260a which exposes a part of the drain 250b. In addition, the second dielectric layer 260 covers the semiconductor bumps 242b. The transparent pixel electrode 270 is disposed on the second dielectric layer 260 and is electrically connected to the drain 250b through the contact hole 260a. The reflective pixel electrode 310 is disposed on the transparent pixel electrode 270 and is electrically connected to the drain 250b through the transparent pixel electrode 270.

In summary, the pixel structure and the fabrication method thereof, according to the present invention, have at least the following advantages:

(1) The semiconductor layer and the semiconductor bumps are simultaneously formed, and thus so-called bumping surfaces are formed. In comparison with the prior art, the fabrication method of a pixel structure provided by the present invention requires less number of the photomasks. Unlike the conventional bumps made of photoresist material, the present invention employs semiconductor bumps, and therefore the pixel structure of the present invention has better reliability.

(2) Since the reflective pixel electrode, the source and the drain of the present invention are formed at the same fabrication step, the fabrication method of a pixel structure according to the present invention is simpler.

(3) The fabrication method of a pixel structure, according to the present invention, is compatible with the current process without the need to increase additional process equipments.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A pixel structure, comprising:
a substrate;
a gate disposed on the substrate;
a first dielectric layer, disposed over the substrate, covering the gate;
a semiconductor layer disposed on the first dielectric layer above the gate;
a plurality of semiconductor bumps disposed on the first dielectric layer;
a source and a drain disposed on the semiconductor layer; and
a reflective pixel electrode, disposed on the first dielectric layer and electrically connected to the drain, covering the semiconductor bumps, wherein the source, the drain and the reflective pixel electrode are formed with the same layer.

2. A pixel structure, comprising:
a substrate;
a gate disposed on the substrate;
a first dielectric layer, disposed over the substrate, covering the gate;
a semiconductor layer disposed on the first dielectric layer above the gate;
a plurality of semiconductor bumps disposed on the first dielectric layer;
a source and a drain disposed on the semiconductor layer; and
a reflective pixel electrode, disposed on the first dielectric layer and electrically connected to the drain, covering the semiconductor bumps;
a second dielectric layer, disposed above the first dielectric layer, covering the semiconductor layer, the source, the drain and the reflective pixel electrode and having a contact hole to expose a part of the drain; and
a transparent pixel electrode disposed on the second dielectric layer and electrically connected to the drain through the contact hole.

3. A pixel structure, comprising:
a substrate;
a gate disposed on the substrate;
a first dielectric layer, disposed over the substrate, covering the gate;
a semiconductor layer disposed on the first dielectric layer above the gate;
a plurality of semiconductor bumps disposed on the first dielectric layer;
a source and a drain disposed on the semiconductor layer; and
a second dielectric layer, disposed on the first dielectric layer, covering the semiconductor bumps and having a contact hole to expose a part of the drain;
a reflective pixel electrode, disposed above the first dielectric layer and electrically connected to the drain, wherein the reflective pixel electrode is disposed on the second dielectric layer and is electrically connected to the drain through the contact hole; and
a transparent pixel electrode disposed on the reflective pixel electrode and electrically connected to the drain through the reflective pixel electrode.

4. A pixel structure, comprising:
a substrate;
a gate disposed on the substrate;
a first dielectric layer, disposed over the substrate, covering the gate;
a semiconductor layer disposed on the first dielectric layer above the gate;
a plurality of semiconductor bumps disposed on the first dielectric layer;
a source and a drain disposed on the semiconductor layer; and
a second dielectric layer, disposed on the first dielectric layer, covering the semiconductor bumps and having a contact hole to expose a part of the drain;

a transparent pixel electrode disposed on the second dielectric layer and electrically connected to the drain through the contact hole; and a reflective pixel electrode, disposed on the transparent pixel electrode, wherein the reflective pixel electrode is electrically connected to the drain through the transparent pixel electrode.

5. The pixel structure of claim 1, 2, 3, or 4, wherein the semiconductor layer and the semiconductor bumps are formed with the same layer.

6. The pixel structure of claim 1, 2, 3, or 4, further comprising an ohmic contact layer disposed on the semiconductor layer and the semiconductor bumps.

7. A method for fabricating a pixel structure, comprising:
providing a substrate;
forming a gate on the substrate;
forming a first dielectric layer over the substrate to cover the gate;
forming a semiconductor layer and a plurality of semiconductor bumps on the first dielectric layer, wherein the semiconductor layer is located on the first dielectric layer over the gate; and
forming a source, a drain and a reflective pixel electrode, wherein the source and the drain, respectively, cover a part of the semiconductor layer, and the reflective pixel electrode covering the semiconductor bumps is electrically connected to the drain, and the source, the drain and the reflective pixel electrode are formed with the same layer.

8. A method for fabricating a pixel structure, comprising:
providing a substrate;
forming a gate on the substrate;
forming a first dielectric layer over the substrate to cover the gate;
forming a semiconductor layer and a plurality of semiconductor bumps on the first dielectric layer, wherein the semiconductor layer is located on the first dielectric layer over the gate
forming a source, a drain and a reflective pixel electrode, wherein the source and the drain, respectively, cover a part of the semiconductor layer, and the reflective pixel electrode covering the semiconductor bumps is electrically connected to the drain;
forming a second dielectric layer, wherein the second dielectric layer covers the substrate and has a contact hole to expose a part of the drain; and
forming a transparent pixel electrode on the second dielectric layer, wherein the transparent pixel electrode is electrically connected to the drain through the contact hole.

9. The method of claim 7 or 8, wherein forming the semiconductor layer and the semiconductor bumps comprises:
forming a semiconductor material layer; and
patterning the semiconductor material layer to form the semiconductor layer and the semiconductor bumps.

10. The method of claim 9, wherein after forming the semiconductor material layer, the fabrication method of a pixel structure further comprises forming an ohmic contact material layer on the semiconductor material layer.

11. A method for fabricating a pixel structure, comprising:
providing a substrate;
forming a gate on the substrate;
forming a first dielectric layer over the substrate so as to cover the gate;
forming a semiconductor layer and a plurality of semiconductor bumps on the first dielectric layer, wherein the semiconductor layer is located on the first dielectric layer above the gate;
forming a source and a drain on the first dielectric layer, wherein the source and the drain, respectively, cover a part of the semiconductor layer;
forming a second dielectric layer on the substrate, wherein the second dielectric layer covers the substrate and the semiconductor bumps, and has a contact hole to expose a part of the drain
forming a reflective pixel electrode on the second dielectric layer, wherein the reflective pixel electrode is electrically connected to the drain; and
prior to forming a reflective pixel electrode on the second dielectric layer, forming a transparent pixel electrode on the second dielectric layer, wherein the transparent pixel electrode is electrically connected to the drain through the contact hole, and the reflective pixel electrode is electrically connected to the drain through the transparent pixel electrode.

12. A method for fabricating a pixel structure, comprising:
providing a substrate;
forming a gate on the substrate;
forming a first dielectric layer over the substrate so as to cover the gate;
forming a semiconductor layer and a plurality of semiconductor bumps on the first dielectric layer, wherein the semiconductor layer is located on the first dielectric layer above the gate;
forming a source and a drain on the first dielectric layer, wherein the source and the drain, respectively, cover a part of the semiconductor layer;
forming a second dielectric layer on the substrate, wherein the second dielectric layer covers the substrate and the semiconductor bumps, and has a contact hole to expose a part of the drain;
forming a reflective pixel electrode on the second dielectric layer, wherein the reflective pixel electrode is electrically connected to the drain; and
after forming a reflective pixel electrode on the second dielectric layer, forming a transparent pixel electrode on the reflective pixel electrode, wherein the transparent pixel electrode is electrically connected to the drain through the reflective pixel electrode.

13. The method of claim 11 or 12, wherein the reflective pixel electrode is formed on the second dielectric layer over the semiconductor bumps.

14. The method of claim 11 or 12, wherein forming the semiconductor layer and the semiconductor bumps comprises:
forming a semiconductor material layer on the first dielectric layer; and
patterning the semiconductor material layer to form the semiconductor layer and the semiconductor bumps.

15. The method of claim 14, further comprising:
after forming the semiconductor material layer, forming an ohmic contact material layer on the semiconductor material layer.

* * * * *